United States Patent [19]

Chambors et al.

[11] Patent Number: 5,396,376
[45] Date of Patent: Mar. 7, 1995

[54] MULTI-TRACK EMBEDDED SERVO RECORDING FORMAT AND METHOD

[75] Inventors: John M. Chambors, Canton; Bruce V. Janiszewski, Ann Arbor; Marlin K. Klumpp, Tecumseh; Nick A. Skogler, Ypsilanti; Lawrence J. Tucker, Whitmore Lake; Robert G. Voss, Saline, all of Mich.

[73] Assignee: Conner Peripherals, Inc., San Jose, Calif.

[21] Appl. No.: 855,239

[22] Filed: Mar. 23, 1992

[51] Int. Cl.⁶ .................... G11B 5/09; G11B 5/584
[52] U.S. Cl. .................... 360/48; 360/49; 360/77.12
[58] Field of Search .................... 360/55, 48, 51, 77.12, 360/77.01, 77.12, 78.14, 78.08, 77.08, 78.02, 77.05, 77.11, 49

[56] References Cited

U.S. PATENT DOCUMENTS

| | | | |
|---|---|---|---|
| 4,390,917 | 6/1983 | Watanabe | 360/128 |
| 4,414,593 | 11/1983 | Miller et al. | 360/102 |
| 4,472,750 | 9/1984 | Klumpp et al. | 360/78.01 |
| 4,476,503 | 10/1984 | Solhjell | 360/75 |
| 4,492,993 | 1/1985 | Otis | 360/74.5 |
| 4,506,342 | 3/1985 | Yamamoto | 360/72.2 |
| 4,586,094 | 4/1986 | Chambors et al. | 360/77.12 |
| 4,858,039 | 8/1989 | Mintzlaff | 360/72.2 |
| 4,964,009 | 10/1990 | Moziya et al. | 360/77.08 |
| 5,003,408 | 3/1991 | Farkas et al. | 360/51 |
| 5,055,951 | 10/1991 | Behr | 360/77.12 |
| 5,073,834 | 12/1991 | Best et al. | 360/77.08 |
| 5,079,654 | 1/1992 | Uno et al. | 360/78.14 |
| 5,153,788 | 10/1992 | Nashikawa et al. | 360/77.08 |

*Primary Examiner*—Donald Hajec
*Assistant Examiner*—Patrick Wamsley
*Attorney, Agent, or Firm*—Fliesler, Dubb, Meyer & Lovejoy

[57] ABSTRACT

A multi-track servo-recording format includes servo zones defined longitudinally by stripes extending across the width of a storage member. Track centering signals are provided within each servo zone for locating the center of each data track on the storage member. Track-identifying indicia are provided at the beginning and end of the storage member and in each written track.

17 Claims, 4 Drawing Sheets

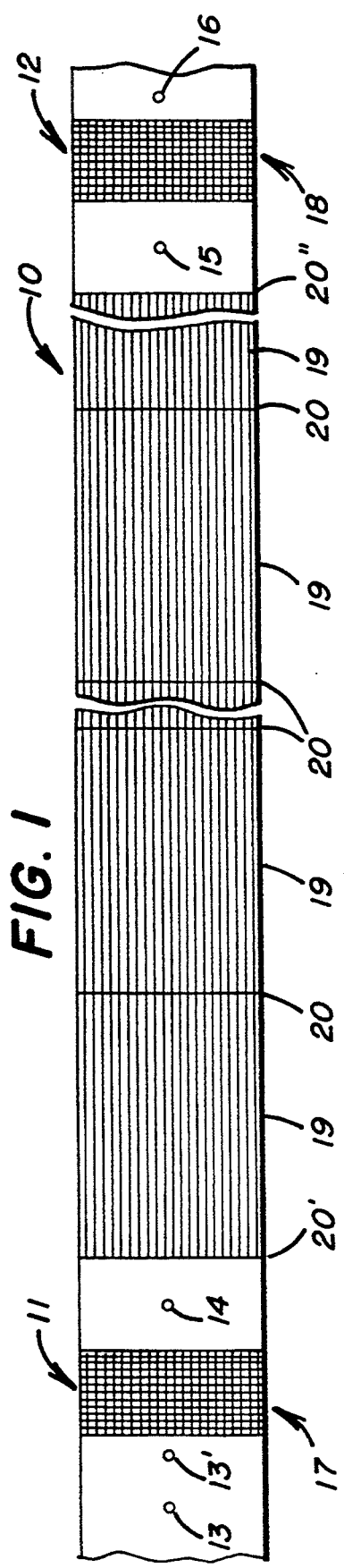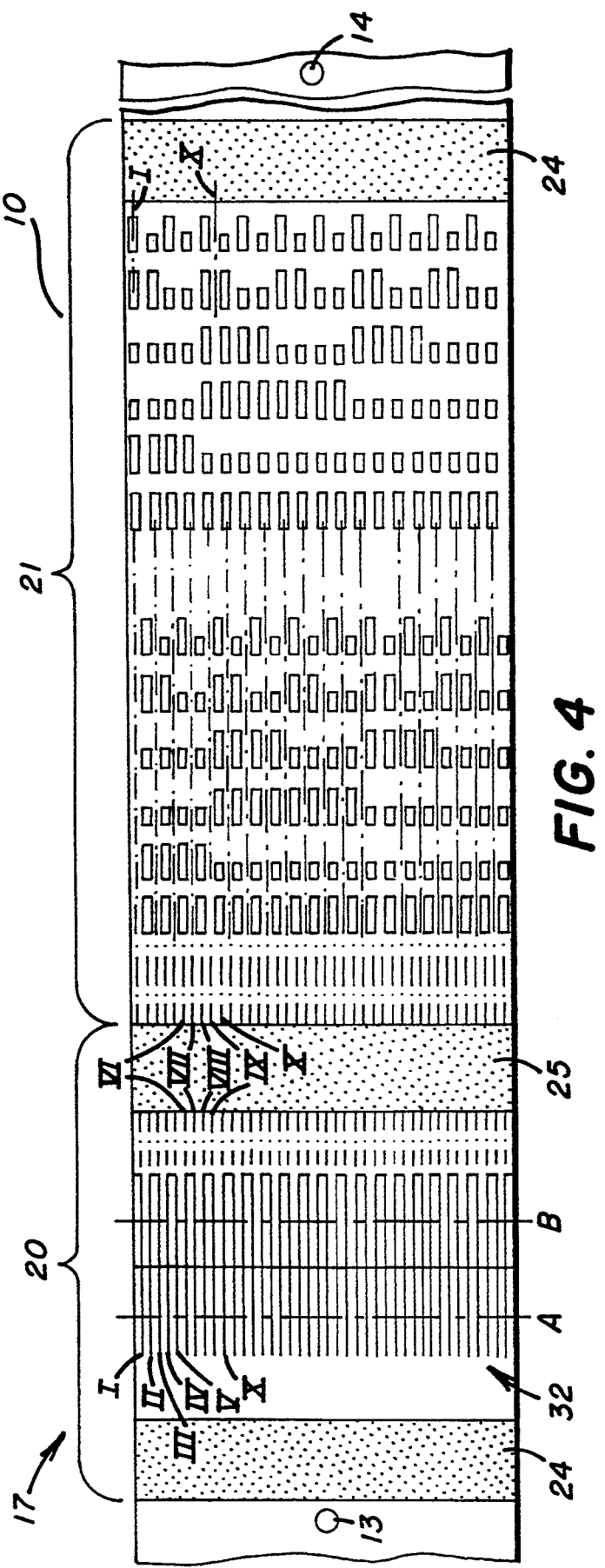

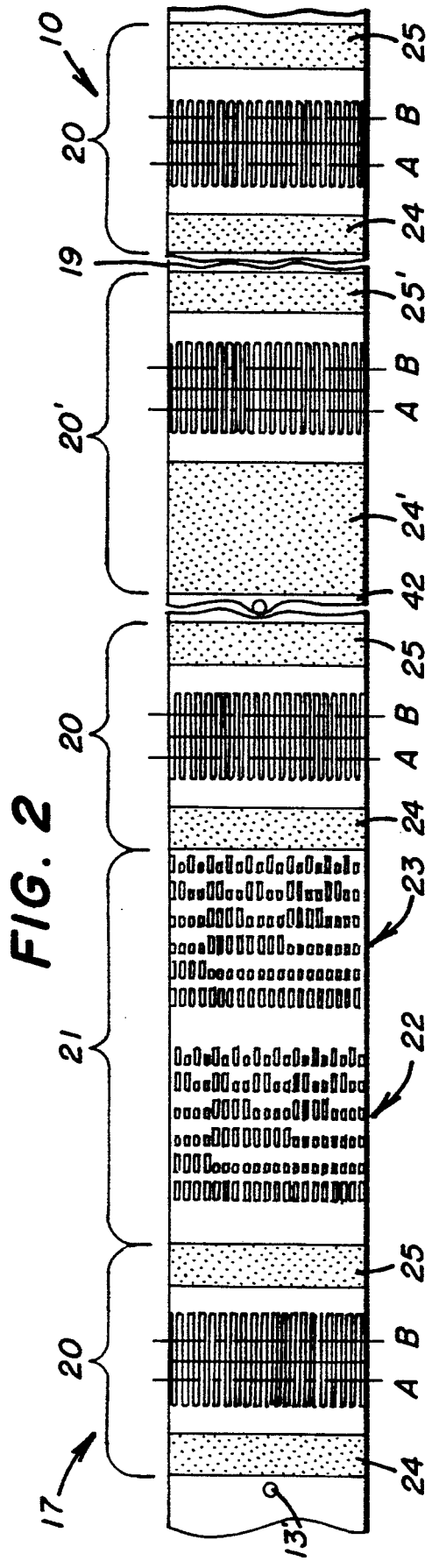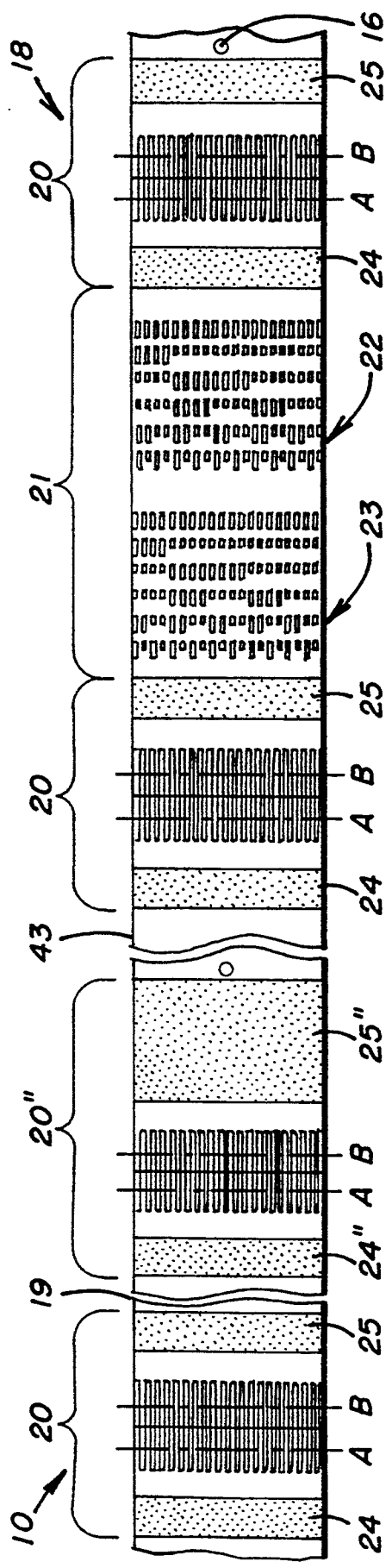

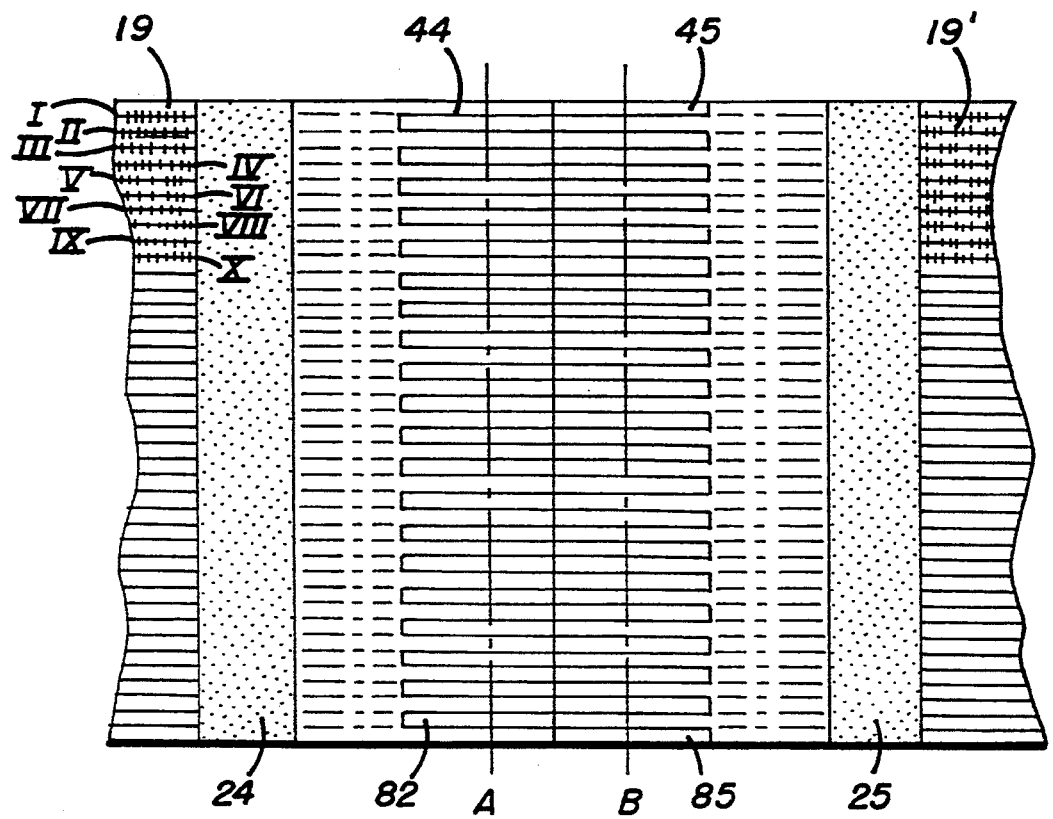
FIG. 5
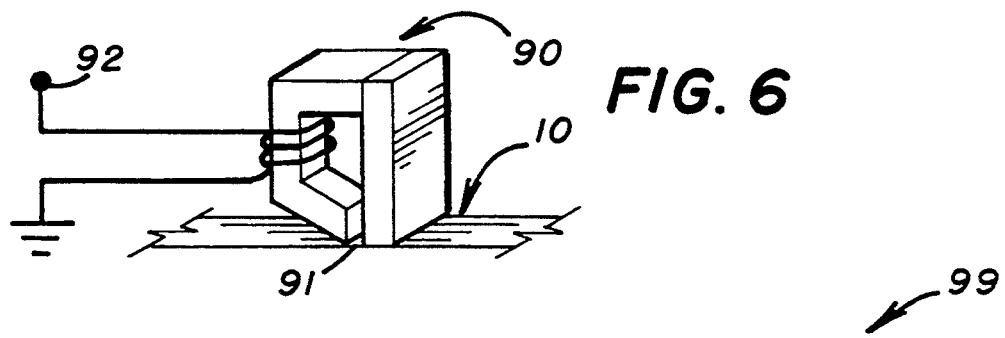
FIG. 6
| PRE-AMBLE | BLOCK MARK | CONTROL FIELD | DATA FIELD | CRC | POST-AMBLE |
|---|---|---|---|---|---|
| 100 | 101 | 102 | 103 | 104 | 105 |
FIG. 7
| USE COUNT | PHYSICAL BLOCK NUMBER | TRACK NUMBER | FORMAT TYPE | REWRITE COUNT |
|---|---|---|---|---|
| 110 | 106 | 107 | 108 | 109 |
FIG. 8

MULTI-TRACK EMBEDDED SERVO RECORDING FORMAT AND METHOD

BACKGROUND OF THE INVENTION

The present invention relates broadly to achieving higher recording track densities on data recording members, or recording media, and to track-following and track-identifying techniques. More particularly, it relates to improved servo-positioning recording formats and methods of recording such servo-positioning formats on recording members. Still more particularly, in the most preferred form, the invention relates to improvements in techniques for initializing the storage medium prior to its intended use by prerecording track-identifying and track-centering servo information thereon, and to the improved record format itself as well as the method of embedding the servo-recording format along the recording track, particularly in conjunction with magnetic tape but in a broader sense with other forms and types of record members, or media, such as disks.

In the use and continued development of moving-media data-memory devices, particularly magnetic tape and disk drives, substantial effort and progress continues toward the goal of increasing the amount of data stored on a given surface area of the recording member. Embedded servo techniques have been developed as a result of these efforts which utilize closely-spaced positioning information, recorded on the storage medium prior to its use for actual data storage operations, to individually identify each of a plurality of closely-spaced tracks on the storage medium. A closed-loop servo-positioning system may be used to follow the prerecorded tracks, thereby increasing the number of data tracks per given area by allowing a narrowing of the data tracks themselves and permitting the placement of data tracks closer together. Known and related servo-positioning systems having a number of significant advantages are disclosed in U.S. Pat. No. 4,472,750, entitled DATA RECORD WITH PRE-RECORDED TRANSDUCER POSITIONING SIGNALS AND TRANSDUCER USING THE SAME, issued to Klumpp et al. on Sep. 18, 1984; and U.S. Pat. No. 4,586,094 entitled, METHOD AND APPARATUS FOR PRE-RECORDING TRACKING INFORMATION ON MAGNETIC MEDIA, issued to Chambors et al. on Apr. 29, 1986, the disclosures of which are incorporated herein by reference.

Although significant increases have been made in the number of tracks which can be provided on magnetic tape storage media, lateral tape motion during lengthwise operating transport remains a significant impediment even where prerecorded servo-tracking signals are used together with closed-loop servo systems. Lateral excursions of a rapid nature or comparatively large magnitude, may occur during stopping and starting conditions, in addition to the excursions which occur during steady-state longitudinal transport of the tape, and all of these make accurate tracking by the transducer particularly difficult. In addition to these lateral excursions, longitudinal tape speed variations and the like also occur, since recording tape is typically under tension as it is transported lengthwise and the tape is subject to varying amounts of stretching during transport, making accurate longitudinal positioning of signals on the tape difficult. For example, wide variations in the tension on magnetic-tape media occur when transport of the tape is stopped and started. Because of the somewhat random occurrence and presence of such conditions, accurate positioning of the transducers relative to the tape itself for recording ("writing") the servo-tracking signals used by the servo system becomes increasingly difficult, and an increasingly important factor, as the track density increases.

Track-centering servo information in accordance with the above-mentioned incorporated prior patents and other such state-of-the-art systems was primarily recorded on the magnetic medium using a single-gap transducer, by which the track-identification signals and track-centering signals were recorded in sequential form on the recording member, one track at a time. Consequently, formatting an entire tape requires repeated passes over its length, which significantly increases the time required to complete the formatting and requires a very large dumber of times that the transducer is switched on and off to write the numerous different bursts. The repeated stopping and starting of the storage medium at the ends of each such run causes relatively wide variations in both the lateral and longitudinal position of the medium during transport, as described above, and thus increases the difficulty of accurately positioning the transducer to record the different signal bursts precisely at the desired locations, to define straight and closely-adjacent tracks with accurately-spaced servo signals therealong. Additionally, even the most accurate recording system has difficulty positioning the transducer such that centering signals in adjacent tracks are aligned with each other across the recording member. This difficulty, amounting to a practical inability to laterally and longitudinally align the centering signals, resulting in a potential for lateral and longitudinal overlap of servo-centering signals which must be spaced from one another to identify track centers, has also helped prevent further reductions in the widths of the tracks as well as the distance between the tracks.

An additional limitation of servo systems utilized heretofore, is that the track-identification signals were usually recorded in groupings with track-centering signals, whereby the tracks may be identified as part of the procedure of transducer centering and track following by the servo system. By providing the track-identification signals along with the servo-tracking signals, the tracks may be identified each time the transducer position is monitored. However, the recording of track-identification signals on the recording medium each time servo-centering signals are recorded significantly increases the amount of recording surface area which is dedicated to the servo-positioning signals, and consequently reduces the surface area which may be used for data storage.

SUMMARY OF THE INVENTION

The present invention provides novel and advantageous servo-positioning record-format techniques which are especially advantageous for use in multi-track, high density, recording applications. Somewhat more particularly, in its more specific application, the format technique provides an advantageous multi-track servo-tracking system having both track-centering and track-identifying aspects, particularly useful for magnetic tape, although in its broader applications, also useful for other forms of media.

In one aspect of the present invention, a novel methodology for recording embedded track-identification patterns and servo-positioning recording-format signals is provided which significantly decreases the time required to format the recording medium, while also greatly facilitating the accurate positioning of the recorded servo-tracking information on the record medium.

In other aspects of the invention, some of the more salient objectives, advantages and features thereof are: to provide a new and highly effective embedded servo-positioning record format and system for use in tape-type devices; to provide a record format whereby the data storage capacity between a load point marker and an early warning marker may be increased over state-of-the-art systems and formats; to provide a record format including servo zones which are bracketed by certain signal stripes which mark the longitudinal perimeter of the servo zone; to provide narrow track-centering signal bursts within the servo zones defined by said stripes; and to provide a format which effectively identifies the different tracks notwithstanding use of only a minimal amount of the recording surface, all in an arrangement and pattern which facilitates both rapid initial formatting (initialization) of the tape and, at the same time, rapid and accurate servo-positioning of the transducer head for actual data storage and retrieval.

The foregoing features, advantages and objectives of the invention will become more apparent and will be better understood by consideration of the ensuing specification and its appended claims, particularly in view of the accompanying drawings.

BRIEF DESCRIPTION OF THE DRAWINGS

FIG. 1 is a fragmentary, pictorial view of one example of a recording member in accordance herewith illustrating the general placement of the positioning information recorded thereon;

FIG. 2 is an enlarged fragmentary view showing a portion of the forward dedicated end area of the recording member of FIG. 1 and indicating the general placement and format of the recorded tracking information contained in such area;

FIG. 3 is an enlarged fragmentary view showing a portion of the rearward dedicated end area of the recording member of FIG. 1 and indicating the general placement and format of the recorded tracking information contained in such area;

FIG. 4 is an enlarged fragmentary view showing a portion of the forward dedicated end area of the recording member of the preceding figures showing servo-tracking signals initially recorded on the recording member;

FIG. 5 is an enlarged fragmentary view showing a medial portion of the recording member of the preceding figures showing a single position centering servo-record format interspersed between data records;

FIG. 6 is a pictorial, fragmentary, perspective view of a recording transducer for recording certain of the signals on the recording member according to the format illustrated in FIGS. 1-4;

FIG. 7 is a schematic diagram of a data block format for data stored on the recording member of FIG. 1;

FIG. 8 is a schematic diagram of a Control Field in the data block format of FIG. 7;

DETAILED DESCRIPTION OF THE PREFERRED EMBODIMENTS

Figure 9A:
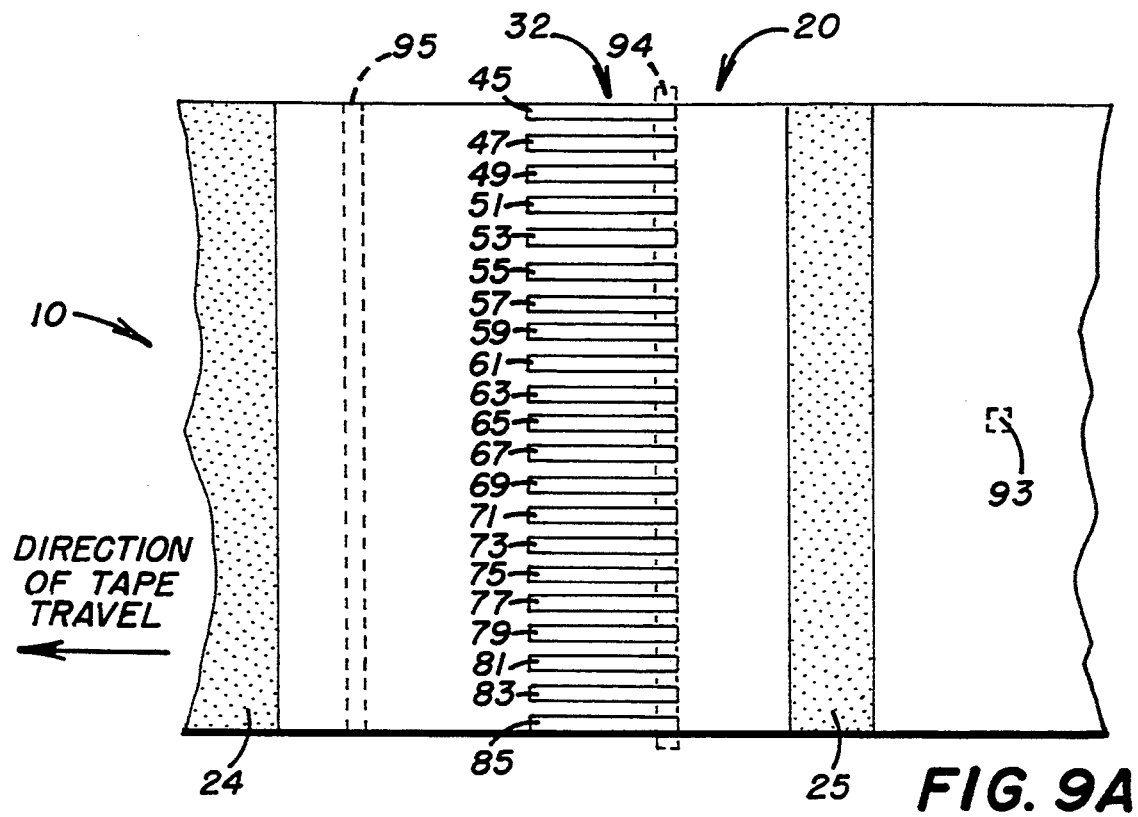
FIG. 9A is an enlarged fragmentary view showing a medial portion of the recording member of the preceding figures showing one column of track-centering servo-recorded signals recorded between the perimeter stripes in the second step of the formatting method according to the invention.

Referring now in more detail to the drawings, FIG. 1 depicts a servo-tracking data storage member, or medium 10, in accordance with the invention, which in the most preferred form is a magnetic tape, in particular, relatively narrow tape of the type typically provided in cartridges or cassettes which may, for example, have a width of one-quarter inch. Such a record medium may, in accordance herewith, include a large number of generally parallel recording tracks, indicated generally in FIG. 1 as horizontally extending spaces delineated by lightly drawn horizontal lines. In a particular example, such a magnetic tape medium formatted according to the present invention may include forty such separate tracks as illustrated herein, although additional or fewer tracks could be advantageously implemented using the format and method of the present invention.

The record medium 10, as depicted in FIG. 1, generally includes leader-type end portions 11 and 12 which include holes 13, 13', 14, 15 and 16, or the like, which serve as markers. The leader-type portion 11 at the forward end of medium 10 typically includes punched holes 13, 13' which serve as beginning-of-tape (BOT) indicia, and a punched hole 14 which serves as a load point (LP) marker indicating the approaching start of data fields on the recording medium in the forward direction of tape travel. The leader-type portion 12 at the rearward end of medium 10 typically includes a punched hole 15 which serves as an early warning (EW) marker, indicating the approaching end of the usable recording area in the forward direction, and an end-of-tape (EOT) indicia 16 identifying the end extremity of the medium. In accordance with the invention, recording member 10 is formatted to have dedicated or restricted areas 17, 18 at the beginning and end of record medium 10, between BOT indicia 13' and LP marker 14 and between EW marker 15 and EOT indicia 16, respectively. The dedicated or restricted areas 17, 18, at the beginning and end of the recording medium 10, respectively, are devoted exclusively to the presence of prerecorded servo-tracking and track-identifying information, as explained further hereinafter. Additionally, recording member 10 includes data fields 19 which may be considered to be segregated or demarked from one another by recorded servo-tracking indicia, i.e., recorded signal patterns forming relatively narrow servo zones, designated by the numeral 20, and described more fully hereinafter.

The dedicated areas 17, 18 at the beginning and end of medium 10, respectively, mentioned briefly above, are illustrated in more detail in FIGS. 2 and 3, respectively. Area 17 in FIG. 2 will be described in detail as being exemplary of both such areas except for those specific differences pointed out hereinafter. As illustrated in FIG. 2, dedicated area 17 includes alternating repetitive patterns of servo zones 20 and track-identification regions 21. As schematically illustrated in FIG.

4, each of the different recording tracks are indicated by the horizontal lines, the first ten of which are designated I–X, inclusive, which are to be understood as falling along the centerline of each such track.

Each such track is uniquely identified in the track-identification region 21 such that it may be located and followed by a transducer whose position is maintained along the track centerline by a servo system using the centering signals of the servo zones 20. For example, each of the tracks I–X may be identified by track numbers which are encoded using a binary code, recorded on the tape in the regions 21. The binary code most preferably utilizes signals wherein a one is represented by a long signal length and a zero is represented by a short signal length in the direction of longitudinal tape transport. Even-numbered tracks are most preferably positioned in a forward-half 22 of the track-identification regions 21 and odd-numbered tracks are most preferably positioned in a rearward-half 23 of the track-identification regions 21, relative to the direction of travel of storage medium 10, when the track identification signals are read therefrom. In a most preferred embodiment, two adjacent tracks have the same code and the odd and even tracks are identified by the location of their respective track-identification signals in the track-identification region.

As illustrated in FIG. 3, dedicated area 18 is identical to dedicated area 17 except that the track-identification signals in regions 21 of dedicated area 18 are reversed from the track-identification signals in dedicated area 17. Accordingly, the track-identification signals read from dedicated area 17 in the forward direction of tape travel are the same as the track-identification signals read from the dedicated area 18 in the reverse direction of tape travel, with the most significant bit of the code read first in both directions of travel.

Each of the servo zones 20 in dedicated areas 17, 18 includes a first magnetically recorded stripe 24 and a second such stripe 25 which together define the lateral perimeters of each such servo zone, and these zones also contain a pair of vertical columns A, B of magnetically recorded servo-tracking bursts, as generally shown. In a particular preferred embodiment, nineteen servo zones 20 and eighteen track-identification regions 21 are provided in each of the dedicated servo areas 17, 18, although only two servo zones 20 and one track-identifying region 21 are shown in FIGS. 2 and 3 for purposes of illustration. Each of the track-identification regions 21 in dedicated areas 17, 18 are of generally uniform dimension. Each of the servo zones 20 in dedicated areas 17 is also of generally uniform dimension. Although the servo zones in dedicated areas 17, 18 are shown in FIGS. 2 and 3 to be the same, the column A and B bursts in the servo zones within dedicated area 18 may be reversed from those in area 17 such that the order in which the A and B bursts in area 18 are read in the reverse direction of tape travel is the same as the order in which the A and B columns in dedicated area 17 are read in the forward direction of tape travel.

The major portion of recording member 10 is located between LP marker 14 and EW marker 15, and as already indicated, is formatted to have repetitive, alternating user data record fields 19 which are set apart from one another by servo zones 20 which comprise track-centering signals positioned between the elongated stripes 24, 25 which extend the entire width of the tape. The general format is that illustrated in FIG. 5, in which a fragmentary part of a pair of successive data record fields 19 and 19' are shown and represented to include a large number of closely-spaced signal transitions which may, for example, be on the order of approximately 95 kilobytes, typically including user data as well as formatting data, as described in greater detail hereinafter. It is contemplated that the various record fields 19 are written in a run-length-limited code according to conventional read-while-write data-writing techniques. As will be apparent to those skilled in the art, where a read-while-write writing technique is used, data are read from the storage medium immediately after the data are written on the storage medium, to verify that the data were accurately recorded. Those data blocks which are not accurately recorded are again recorded in a new location. The actual amount of data stored in any particular data record field 19 will thus depend upon the number of times each data block is recorded on the medium before the recorder verifies that the data block was accurately recorded.

As illustrated in FIGS. 1, 2, 3 and 5, interspersed between each of the record fields 19, 19' in which the user's data are recorded are the aforementioned servo zones 20. As described above, each servo zone 20 is disposed between a pair of the elongated stripes, or boundary signals 24, 25 which extend the entire width of the recording member 10. The stripes 24, 25 for all the servo zones 20 are magnetically recorded on the recording member and are generally of uniform width; however, the first servo zone 20' (FIG. 2) adjacent LP marker 14 and inboard thereof, includes a stripe 24' and the last servo zone 20" (FIG. 3) of the recording member which is adjacent EW marker 15 (FIG. 1) includes a stripe 25". In the preferred embodiment of the invention, stripes 24', 25" are at least two times greater in width than any of the other elongated stripes 24, 25 associated with other servo zones, and in the most preferred embodiment, stripes 24', 25" are three times wider than such other stripes Since the wider stripes 24', 25" will result in a different (longer) signal upon being read, the microprocessor (not shown) of the data recorder (not shown) can readily detect the resulting signal to identify the first and last servo zones in the record field area, which are adjacent markers 14 and 15. Of course, these terminal servo zones 20' and 20" are separated from the dedicated servo area 17, by fields 42, 43, respectively, of blank (unrecorded) tape extending therebetween. These fields of blank tape most preferably include the EW and LP holes 14, 15 at respective ends of the recording media 10. The dimension of these blank fields is preset to insure that the first servo zone 20' and the last servo zone 20" are recorded on storage medium 10 between the LP marker 14 and the EW marker 15.

Figure 9B:
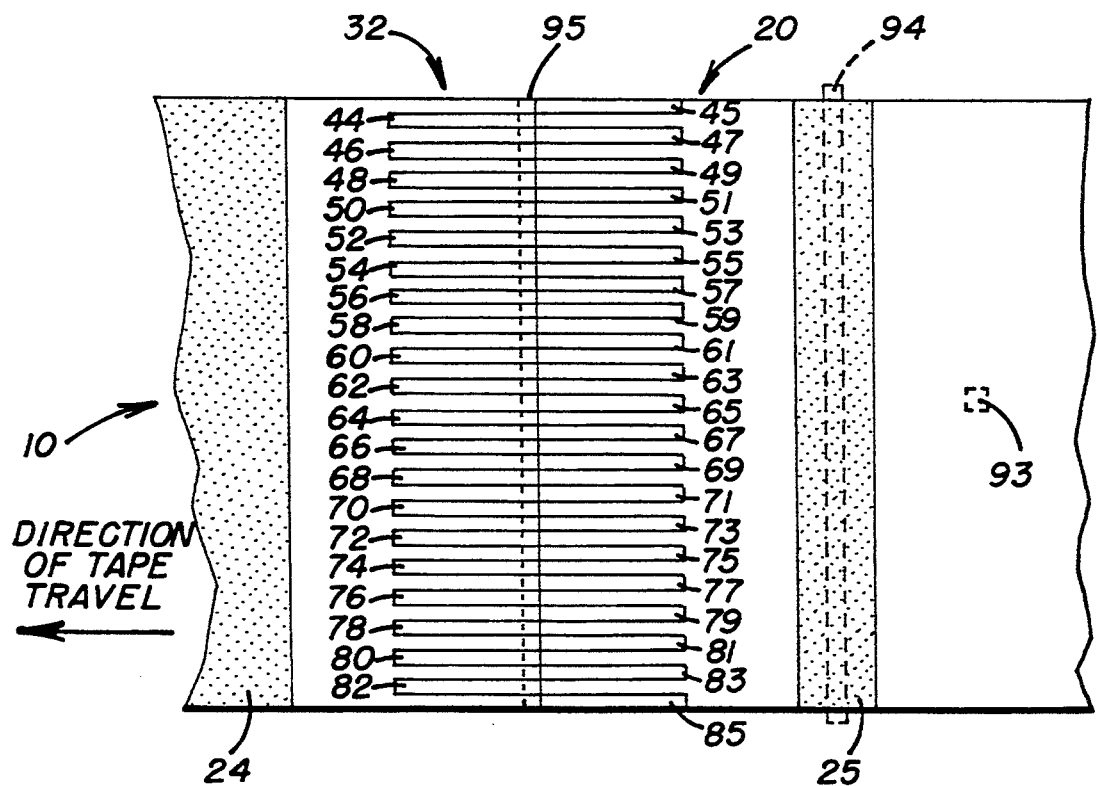
FIG. 9B is an enlarged fragmentary view showing a portion of one end area of the recording member of FIG. 1 and showing the general placement of the track-identifying information recorded on the recording member in the third step of formatting the recording member according to the invention.

Somewhat more particularly and with reference to FIGS. 4, 9A and 9B, the servo zones 20 each include a pair of the two elongated stripes 24, 25, extending the entire width of the tape and defining the longitudinal regions of the servo zones. These servo stripes are preferably recorded with a flux density which is distinct from any other signal recorded on storage medium 10 and a transducer reading signals on the recording medium is responsive to the distinct flux density to generate an output signal having a distinctive frequency. For illustrative purposes, servo zone track-centering signals 32 include an A column and a B column of tracking bursts. These tracking bursts are recorded with a flux density equal to that of the track-identification signals in region 21. In the embodiment illustrated, column A includes twenty such bursts, designated by the even numerals 44–82 inclusive. Column B includes twenty-one such bursts designated, by the odd numerals 45–85 inclusive. These different odd and even-numbered bursts are preferably uniformly spaced across the width of recording member 10, with the first such bursts 45 and the last bursts 85 abutting the edges of the recording member. Each pair of the odd and even-numbered bursts are both vertically and horizontally contiguous such that little or no narrow vertical spacing exists between consecutive odd and even-number bursts, and their adjacent side edges define track centerlines (see I–X in FIGS. 4 and 5). While the A and B columns of servo-tracking indicia are most preferably directly adjacent one another, they do not overlap at any point.

The data within record fields 19, 19' is recorded in generally parallel tracks on record medium 10 and formatted into data blocks 99 (FIG. 7) which, in a preferred embodiment, are formatted into data frames. For example, a data frame may include thirty-two data blocks. Data frames most preferably include at least one data frame header which describes the contents of the data blocks that immediately follow the data frame header, i.e., the type of data block which follows. As is well known and conventional, the data blocks may be of various types including user blocks having host data therein, control blocks storing control data, identifier blocks which are reserved for the first frame of track zero, filler blocks including no valid data, error correction code (ECC) blocks, and end-of-data (EOD) blocks. Since data may be stored in compressed or uncompressed form, and compressed data may be stored using more than one compression method, the data frame header preferably includes data bytes identifying the method by which the data blocks are stored. A data frame may include more than one header, as each data frame header will describe consecutive data sequences of the same type which are stored in the same manner. The data blocks preferably include formatting information which is utilized by a microprocessor (not shown) in the data recorder (not shown) when reading and recovering data from storage medium 10 as generally described hereinafter. The microprocessor preferably reads the control fields and data frame headers and is responsive thereto by outputting to the host device only the original data supplied from the host device. Thus, the control signals stored on the storage medium are most preferably "transparent" to the host, in a preferred embodiment.

With more particular reference to the preferred embodiment of FIGS. 7 and 8, each data block 99 is preferably formatted to include a Preamble 100 consisting of a pattern of alternating zeros and ones used by the drive (not shown) for timing purposes, as is well known and accordingly not described in greater detail herein. The Preamble 100 may be of normal or elongated length. Normal Preambles are provided in each data block, and may, for example, be thirteen to thirty bytes long. Elongated Preambles are recorded in the first data block of each track following a servo zone. Elongated Preambles may, for example, be ten to twelve hundred bytes long and are most preferably immediately followed by a normal preamble. A Block Marker 101 which marks the start of a new block, or a new frame if the block is the first block in a frame, is also provided in each block. A Control Field 102 in each block includes control bytes 106 identifying the Block Number, or address. A control byte 107 is also provided in the Control Field to identify the physical Track Number in which the block is recorded. The track number control byte is particularly advantageous as the recorder includes a microprocessor which reads the control byte to identify the track with which the transducer is aligned as the blocks are read from the storage medium.

Thus, the comparatively long track-identification signals recorded in the track-identification regions 21 are not recorded with those servo zones 20 located between the data fields 19, and the data capacity of the storage medium is accordingly increased. The Control Field 102 may also include a Use Count 110 which includes a pair of control bytes to identify the number of times the medium has been rewritten from the beginning of the tape. Also, Control Field 102 may include a Format Type byte 108 whose value identifies a definition change regarding the processing of the other Control Field bytes, together with a Rewrite Count 109 that may be incremented upon block rewrite, thus presenting a new data pattern to a CRC generator (not shown). The rules regarding block rewrite are well understood and conventional. The CRC generator will then calculate four new CRC bytes for purposes of error detection in the Control Field and data field. The data blocks 99 additionally include a data field 103 (FIG. 7) which, for example, contains 1040 bytes of data. The data blocks may also contain CRC data 104 which, for example, consists of four bytes calculated to detect errors in the data field and the Control Field, as is well known. Each data block also includes a Postamble 105 which, like the Preamble, comprises an alternating pattern of ones and zeros. Postambles may also be of a normal or elongated length, and they are utilized by the drive for timing purposes when the recording member 10 is transported in the reverse direction. Elongated Postambles are recorded in the last data block before a servo zone.

To format the record medium 10, a stripe recorder (not specifically shown), which includes a wide write-core transducer 90 (FIG. 6), is initially used to record the sequential, spaced, comparatively wide stripes 24, 25 which preferably extend across the entire width of the storage media. To write these wide stripes, the stripe recorder transducer 90 preferably uses a write-core gap 91 whose overall width is greater than that of the storage medium 10. In this process, the stripe recorder preferably first measures the length of the particular storage medium to be formatted by transporting the medium in a first direction over its entire length. In the case of magnetic tape media this initial forward pass may also serve as a tensioning run by which the tape is placed under a generally uniform tension along its entire length. Such a length measurement may readily be done using a tachometer coupled to the drive motor or capstan, which tape drives frequently include for various purposes, since by counting the number of rotations required to transport the entire length of the storage media in a forward pass, a measurement of length is provided. Of course, there are many other ways to measure the medium length during transport. Once a measurement of the medium length is obtained, the drive controller may be used to compute the number of data fields 19 that will fit on that particular medium, thereby also determining where the sequential servo zones will be recorded. The length of storage medium 10 is preferably measured in each instance since commercially available storage medium may have any of several nominal lengths, all of which have a certain tolerance, and this tolerance can change the number of recording regions which will fit on a particular sample of recording media.

After the length of the recording member 10 is so measured, it is driven in the opposite direction of travel in a reverse pass, and during this pass the wide, spaced stripes 24, 25 are recorded at uniform intervals for all the servo regions 20 determined for the particular recording member involved, including the dedicated regions 17, 18 at the ends thereof. This may readily be done by use of a transducer 90 as shown in FIG. 6, by applying an energizing signal to its write coil 92, in a known manner. Because the recording device (drive) to be used in this process will, as is typical, have a motor and drive mechanism which drives the storage media itself at different speeds throughout transport of the tape, the spacing of the servo stripes on the storage media may not be precisely uniform, although the spacing will preferably not vary significantly. All of the stripes 24, 25, etc. (including the extra-wide stripes 28 and 37) are thus recorded on the storage media as it passes the write head 90 in this reverse pass.

After the stripes 24, 25, have been recorded on the recording member 10, the servo-tracking signals 44–83 inclusive and 85 are recorded within the zones 20. To record these centering signals, the recording member 10 is most preferably placed in a second recorder, or drive, which includes a different transducer (as noted below) for recording these relatively short bursts. Of course, a single recorder device could be used for both types of recording, preferably by including separate heads for recording the stripes 24, 25 and the servo-tracking signals 44–83 and 85, but the use of separate recorders has certain advantages and is currently preferred.

A preferred form of tape head which can be advantageously utilized to simultaneously record all of the servo-tracking bursts 44–85 is illustrated in co-pending patent application entitled MULTI-TRACK SERVO RECORDING HEAD (U.S. patent application Ser. No. 07/813,198) naming inventors Gordenker et el., the disclosure of which is incorporated herein by reference. This transducer includes magnetic-read transducer 93 (indicated in phantom) which detects the passage of each of the stripes 24, 25 and outputs the distinctive frequency by which they are recorded. For detecting this unique frequency, known types of circuitry may be used, e.g., one using an appropriately tuned filter (not shown), a comparator (not shown) and a rectifier (not shown) to output logic signals indicating whether a signal having-the desired frequency is input to the LC filter from read-core transducer 93.

The recording device used for further formatting may, for example, include a microprocessor (not shown) which receives such an output logic level and in response controls the writing of the servo burst signals on the record member. However specifically implemented, responsive to the detected leading stripe 24, the recording device writes the entire B column (FIG. 8) of servo-tracking bursts, preferably using a multi-gap write-core transducer 94 (indicated in phantom), a predetermined time period after the leading stripe 24 is detected. A predetermined time thereafter, the multi-gap write-core 95 (indicated in phantom) is energized to record the column A Centering signals on storage medium 10. The spacing of cores 93, 94, 95 and stripes 24, 25 of each zone 20, may be such that the read core 93 outputs an electrical signal indicating that the lagging stripe 25 for the particular zone 20 in which track-centering signals are recorded is beneath the read-core following recording of the second column on the storage medium. The lagging stripe 25 will thus provide an indication to the recorder controller that column B signals are positioned within-a servo zone, i.e., between stripes 24, 25. However, the servo zone is most preferably dimensioned such that the read core is beyond the trailing stripe 25 such that the available recording area of medium 10 is as large as possible.

In actual application, it may be difficult to balance the strength of the signals from the A and B bursts because they are written by two different multi-gap write cores. An alternate approach to-writing the servo bursts could involve using a single such core to write both the A and B bursts on two separate passes over the tape. On the first pass, the head can be positioned to align the gaps for the A column with the location of the B bursts and the A gaps could then be used to write the B bursts. The tape could then be rewound and the position of the head incremented to align the A column gaps with the desired location of the A bursts. The A bursts could then be written by the A column gaps on the second write pass over the tape. This method could guarantee the matching of the A and B bursts because they were written by the same multi-gap transducer.

Regardless of the overall width of servo zones 20, all of the centering signals in each separate column (A and B) are written simultaneously, whereby the recorded bursts in each column are precisely aligned and the spacing of the bursts in each column are assured by the physical spacing of the gaps built into transducers 94 and 95. Those skilled in the art will recognize that although multi-gap transducers are the preferred form of write head for recording the multiple-track centering signals, as this is the most expedient method of accurately and consistently recording such multiple-signal bursts, the stripes 24, 25 defining the boundaries of the servo zones 20 may be used as a longitudinal reference for the accurate aligning of servo-track centering signals which are recorded using a commercial transducer one track at a time.

After the centering signals of columns A and B are recorded in the various servo zones 20, the track-identification signals of regions 21 are recorded adjacent each of the servo zones in the dedicated areas 17, 18 at the beginning and end of the recording member. The track-identifying indicia is most preferably recorded by using a commercial recorder head (not shown) which may in essence be of the same type used to record user data. In this procedure, the previously recorded servo-tracking signals 44–83 inclusive and 85 are preferably used to accurately align the head over each of the appropriate tracks being identified, as desired. Most preferably, in accordance with the present invention and the format provided, track-identification signals are only recorded in the dedicated areas 17 at the beginning of recording member 10 and the dedicated area 18 at the end of the recording member 10. Because track-identifying indicia are not recorded intermediate the dedicated end areas 17, 18 in the preferred embodiment, the recordable surface area of the record member between servo regions 20 other than those in the end areas 17, 18 is exclusively dedicated to user data storage, which significantly increases the data storage capacity of the recording member.

It is to be understood that the foregoing description of the preferred embodiment of the invention is provided for purposes of description and illustration, not as a measure of the invention whose scope is to be defined by reference to the ensuing claims. Thus, while those skilled in the art may devise embodiments of the particular concepts presented in the foregoing illustrative disclosure which differ somewhat from the particular embodiments shown and described in detail herein, or may make various changes in structural details to the illustrated embodiments, all such alternative or modified embodiments which utilize the concepts of the invention, and clearly incorporate the spirit thereof, are to be considered as within the scope of the claims appended herebelow, unless such claims by their language specifically state otherwise.

The embodiments of the invention in which an exclusive property or privilege is claimed are defined as follows.

1. A formatted servo-tracking data recording member having storage capacity for recording and storing data, said recording member comprising:
   a plurality of data fields on the recording member providing said data storage capacity, said data fields being disposed within and along a plurality of generally parallel recording data tracks;
   servo zones including track-centering signals for following along said recording tracks and recorded boundary signals adjacent opposite sides of the track centering signals, the recorded boundary signals for identifying the lateral perimeters of said servo zone, whereby a portion of the servo zones separate said data fields; and
   track-identification regions recorded only in one or more dedicated areas near ends of the recording member, said track-identification regions including signals encoded to uniquely identify each of the plurality of data tracks in the data fields.

2. The formatted servo-tracking data recording member as defined in claim 1, wherein said recording member comprises magnetic tape.

3. The formatted servo-tracking data recording member as defined in claim 1, wherein a portion of the servo zones and the track-identification regions are disposed in alternating relation.

4. The formatted servo-tracking data recording member as defined in claim 2, wherein said recording member includes markers at ends of said tape, and wherein certain of the servo zones disposed adjacent one of the data fields and one of said markers include a wider one of the recorded boundary regions than other of said servo zones for identifying the ends of the tape.

5. The formatted servo-tracking data recording member as defined in claim 1, further including user data recorded in said data fields, said data including formatting information, said formatting information including signals identifying the track in which said data are recorded.

6. A method of formatting a recording member to have a plurality of data-storing fields including parallel tracks, said method comprising the steps of:
   recording a plurality of stripes on said recording member having a flux density distinct from other signals subsequently recorded on the recording member, said stripes defining the longitudinal perimeter of servo zones on said recording member; and
   recording track-centering signals in said servo zones between and adjacent to a pair of said stripes by detecting at least one of said stripes and positioning said track-centering signals relative to such stripe and within the servo zone defined thereby, said track-centering signals comprising means for identifying a center of at least one data track in said data fields.

7. The method as defined in claim 6, further including the step of recording track-identification regions on said recording member only in one or more dedicated areas near ends of the recording member, said track-identification regions uniquely identifying each of said tracks in said data fields.

8. The method as defined in claim 6, wherein said stripes are recorded on said recording member by using a first transducer which includes a write core extending substantially the entire width of the recording member for recording said stripes to extend substantially the entire width of the recording member in a single pass.

9. A formatted multi-track servo-recorded magnetic tape comprising:
   data fields including a plurality of tracks for storing data therein, said data fields positioned on said tape between a load point marker and an early warning marker disposed thereon; and
   track-identification regions located ahead of said load point marker and behind said early warning marker in the forward direction of travel of said tape, said track-identification regions carrying recorded track-identification signals adapted to identify the different tracks comprising said plurality of tracks.

10. The formatted multi-track servo-recorded magnetic tape as defined in claim 16, further including servo zones on said tape between said data fields and track-identifying regions.

11. The formatted multi-track servo-recorded magnetic tape as defined in claim 10, wherein said track-identification signal regions are located only at each end portion of the magnetic tape.

12. The formatted multi-track servo-recorded magnetic tape as defined in claim 11, wherein said servo zones and track-identification regions are alternately repeated at the beginning and end of the tape, and wherein said tape includes transversely extending recorded stripes marking the longitudinal perimeters of said servo zones.

13. The formatted multi-track servo-recorded magnetic tape as defined in claim 10, wherein said servo zones include stripes identifying the longitudinal perimeters of said servo zones and track-centering signals recorded between and adjacent to said stripes.

14. The formatted multi-track servo recorded magnetic tape as defined in claim 13, wherein a first servo zone is recorded between said load point marker and one of said data fields and a second servo zone is recorded between said early warning marker and one of said data fields, each of said first and second servo zones including a stripe having a width greater than other stripes recorded on said recording member.

15. A formatted multi-track embedded-servo data-storage member comprising:
   data fields on said recording member, said data fields including a plurality of data tracks for storing data signals therein; and
   servo zones recorded on said storage member, said servo zones including track-centering signals with adjacent boundary stripes, the boundary stripes being recorded with a flux density distinct from other signals recorded on the storage member for identifying perimeters of the servo zones, the track-centering signals for use by a servo system to follow along individual ones of said data tracks containing the data fields.

16. A formatted data recording member having data storage capacity for recording data, said recording member comprising:
    data fields on said recording member, said data fields providing said data storage capacity;
    markers for identifying the area of the recording member adapted for use in recording data; and
    servo zones including stripes recorded on said recording member for identifying perimeters of the servo zones, wherein respective ones of the servo zones are each recorded between one of said markers and one of the data fields and include a stripe wider than stripes of other servo zones recorded on said recording member.

17. A multi-track servo-recorded magnetic tape comprising:
    a load point marker and an early warning marker disposed at opposite ends of the tape;
    data fields included in a plurality of tracks on the tape for storing data, said data fields positioned on said tape between the load point marker and the early warning marker; and
    track identification regions located only on areas of the tape outside of the area between the load point marker and the early warning marker, said track identification regions including signals for identifying individual tracks in the plurality of tracks; and
    servo zones including track-centering signals with adjacent boundary stripes, the boundary stripes being recorded with a flux density distinct from other signals recorded on the tape for identifying perimeters of the servo zones, the track-centering signals enabling following along an individual track in the plurality of tracks, the servo zones provided on the tape separating the track-identification regions and separating the plurality of data fields,
    wherein a first servo zone is recorded between said load point marker and one of said data fields and a second servo zone is recorded between said early warning marker and one of said data fields, each of said first and second servo zones including a stripe having a width greater than other stripes recorded on said recording member.

* * * * *

UNITED STATES PATENT AND TRADEMARK OFFICE
CERTIFICATE OF CORRECTION

PATENT NO.   : 5,396,376
DATED        : March 7, 1995
INVENTOR(S)  : Chambors, et al.

It is certified that error appears in the above-indentified patent and that said Letters Patent is hereby corrected as shown below:

Column 6, line 27, after "on" delete "-".

Column 6, line 38, after "stripes", first occurrence, insert --.--.

Column 8, line 49, after "media" insert --,--.

Column 9, line 49, after "having" delete "-".

Column 9, line 63, after "A" delete "Centering" and substitute --centering--.

Column 10, line 4, after "within" delete "-".

Column 10, line 12, after "to" delete "-".

Column 12, line 29, after "claim" delete "16" and substitute --9--.

Signed and Sealed this

Sixth Day of June, 1995

Attest:

BRUCE LEHMAN

*Attesting Officer*                *Commissioner of Patents and Trademarks*